United States Patent [19]

Baker

[11] 4,343,838

[45] Aug. 10, 1982

[54] PREPARATION OF A SURFACE FOR ADHESIVE BONDING

[75] Inventor: Francis S. Baker, Old Harlow, England

[73] Assignee: The Secretary of State for Defence in Her Britannic Majesty's Government of the United Kingdom of Great Britain and Northern Ireland, London, England

[21] Appl. No.: 138,797

[22] Filed: Apr. 9, 1980

[30] Foreign Application Priority Data

Apr. 11, 1979 [GB] United Kingdom ............... 7912865

[51] Int. Cl.$^3$ .............................................. B05D 3/12
[52] U.S. Cl. ...................................... 427/292; 51/319; 51/320; 51/321; 118/58; 118/64; 118/66; 118/69; 118/72; 118/401; 118/407; 427/331; 427/348; 427/377; 427/398.4; 427/420
[58] Field of Search ............... 427/327, 299, 358, 290, 427/292, 377, 348, 398, 331, 420; 118/72, 100, 104, 64, 58, 65, 69, 66, 67; 51/319-321

[56] References Cited

U.S. PATENT DOCUMENTS

| | | | |
|---|---|---|---|
| 2,743,554 | 5/1956 | Dailey et al. | 51/321 |
| 3,689,311 | 9/1972 | Loeffler et al. | 427/327 |
| 3,762,939 | 10/1973 | Hunter | 427/327 |
| 4,044,507 | 8/1977 | Cox et al. | 51/321 |
| 4,096,300 | 6/1978 | William et al. | 427/327 |

Primary Examiner—John D. Smith
Assistant Examiner—Janyce A. Bell
Attorney, Agent, or Firm—Pollock, Vande Sande & Priddy

[57] ABSTRACT

A process for preparing a surface for adhesive bonding to a second surface having the steps of abrasion cleaning the surface and then applying an adhesive thereon, wherein the improvement over prior art processes comprises the displacement of atmospheric gases from the surface by means of a dry inert gas. The abrasion cleaning is preferably achieved by bombarding the surface with particulate matter and removing the particulate matter before application of adhesive to the surface. The process is suitable for preparing metal surfaces for metal to metal bonds.

6 Claims, 1 Drawing Figure

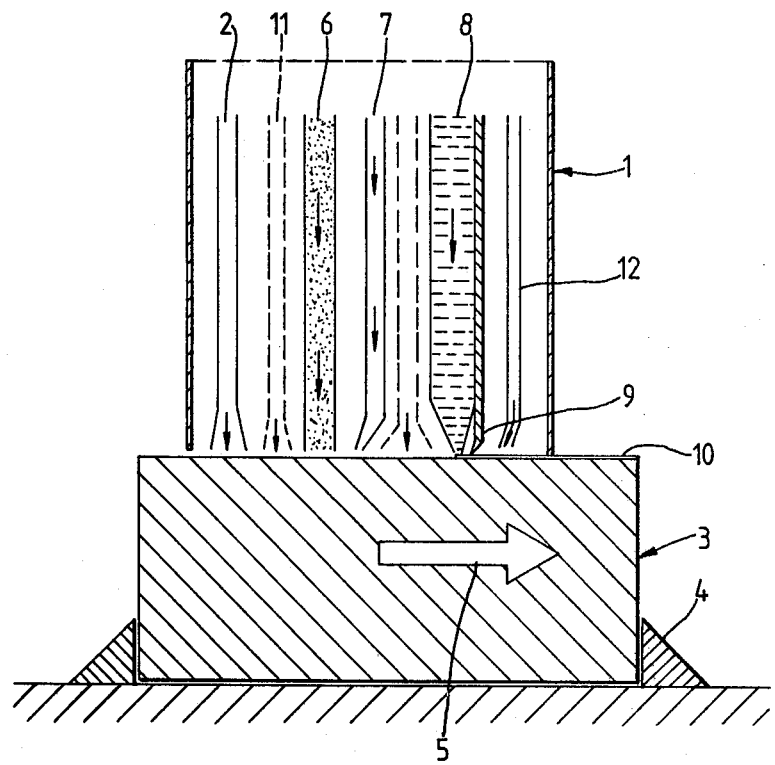

PREPARATION OF A SURFACE FOR ADHESIVE BONDING

This invention relates to the preparation of a surface, more especially a metal surface, for adhesive bonding of the surface to a second surface.

It is known that in order to produce a good adhesive union between two pieces of metal the surfaces to be joined must be thoroughly cleaned. In the case of the bonding of mild steel the cleaning can be achieved by subjecting the surfaces to be joined to a solvent wash, followed by an alumina grit blast and a second solvent wash. The solvent is allowed to evaporate and an adhesive is applied to the cleaned surface. This procedure generally gives a strong joint in dry, room temperature conditions, but there is usually a considerable fall in bond strength in hot moist environments. This is thought to be due to the contamination of the surface, immediately after cleaning, by a thin layer of carbonaceous material and possibly an oxide layer derived both from the solvent bath and the ambient atmosphere.

The present invention seeks to provide a means whereby a strong bond, resistant to hot, moist atmospheres can be produced in an industrial environment.

According to the invention preparation of a surface for adhesive bonding thereof to a second surface includes the steps of abrasion-cleaning the surface and then applying adhesive thereon while atmospheric gases are displaced from the surface by a dry inert gas.

The abrasion-cleaning preferably comprises bombarding the surface with particulate matter and then removing the particulate matter from the surface before application of the adhesive.

The particulate matter is desirably removed by means of a flow of an inert gas which is conveniently agron or nitrogen.

Alternatively the particulate matter may be at least partly removed by an accelerating force. Preferably the accelerating force is gravity.

The invention comprises both a method of preparation and apparatus for carrying out the method.

The invention will now be further described by way of example only, with reference to the accompanying drawing (FIG. 1) which is a diagrammatic sectional view of an apparatus for cleaning and then applying adhesive to a metal surface.

The FIGURE is a machine which, in a first embodiment, comprises a hood 1 enclosing a working volume into which dry argon is injected through high pressure ducts 2 which continually purge air from beneath the hood. A workpiece 3 is held on a workbase with an adjustable clamping arrangement 4. The workbase and clamps move in the direction indicated by the arrow 5 and hence move the workpiece transversally beneath the hood. At this movement occurs a point on the surface of the workpiece will encounter a number of further operations. Inert gas purging, the first of these operations, has already been mentioned. The second operation is grit blasting; here particles of grit carried in a dry inert gas stream are blown at high pressure against the surface to be prepared through a duct 6. Any grit particles remaining upon the surface are blown away by a high pressure dry inert gas jet from another duct 7. Adhesive is then applied to the surface from a metered adhesive dispenser 8. The adhesive is spread evenly by a doctor blade 9 to form a thin film of adhesive on the surface 10. The film of adhesive substantially inhibits any subsequent contamination of the surface.

It is important that the time between grit-blasting and the application of the adhesive is kept to a minimum in order to minimize the chance of recontamination.

Further dry argon jets 11 can be used where necessary in order to keep the surface as free from contamination as possible. Another high pressure jet 12 may, in one arrangement of the invention, be incorporated downstream of the doctor blade to ensure exclusion of atmospheric gases.

In a modification of this invention the relative motion between the machine and the workpiece may conveniently be provided by the motion of the machine over the workpiece, which remains stationary.

A further modification provides separate stages for each of the operations of grit blasting and adhesive spreading, this being done if it is necessary to ensure that no grit contaminates the adhesive. The transition between the stages is preferably carried out in a dry, inert atmosphere.

A suitable inert gas for the method of this invention is argon, but in many instances nitrogen is sufficiently inert. Alumina is a suitable grit blasting material.

In a further modification of this invention the abrasion cleaning is carried out with the workpiece inverted, the loose particles, of eg grit, then falling from the surface under the action of gravity. The workpiece is righted before the adhesive is applied.

In all the various possible embodiments and modifications of this invention, provision is made for delivering high viscosity adhesives under pressure.

In the present specification the term inert gas means a gas which does not react with the substrate in a manner which has a deleterious effect on the strength of the bond eventually formed.

I claim:

1. A process for preparing a metal surface for adhesive bonding to a second surface having the steps of abrasion cleaning the metal surface by bombardment of the metal surface with particulate matter followed by removal of said particulate matter and then applying an adhesive to the cleaned metal surface, wherein the improvement comprises the continual purging of atmospheric gases from the metal surface by supplying a dry inert gas to said surface throughout said process.

2. A process according to claim 1 in which the removal of said particulate material is effected by means of a flow of the inert gas.

3. A process according to claim 1 in which the inert gas is nitrogen or argon.

4. A process according to claim 1 in which the removal of said particulate matter is effected by bombardment of the metal surface while the metal surface is in an inverted configuration so that said particulate matter falls from said metal surface under the action of gravity.

5. A process according to claim 4 in which the inert gas is nitrogen or argon.

6. An apparatus for preparing a metal surface for adhesive bonding to a second surface comprising ducted container means disposed adjacent the metal surface, means within said ducted container means for bombarding the metal surface with particulate material to clean said surface, means within said ducted container means for removing excess particulate material from said surface following said bombardment, adhesive applicator means within said ducted container means for applying a layer of adhesive to said cleaned surface, and means for injecting an inert gas into said container means to continually purge air from said container means and to effect the exclusion of atmospheric gases from the region adjacent said metal surface during the operations of said bombarding means, said removing means and said adhesive applicator means.

* * * * *